US009278328B2

(12) United States Patent
Schlichting et al.

(10) Patent No.: US 9,278,328 B2
(45) Date of Patent: Mar. 8, 2016

(54) REFORMER TUBE WITH INTERNAL HEAT EXCHANGE

(71) Applicants: Holger Schlichting, Hofheim (DE); Ulrich Wolf, Egelsbach (DE); Sven Pohl, Frankfurt am Main (DE); Dieter Ulber, Steinbach (DE); Udo Zolnowski, Linden (DE); Antonio Coscia, Hadamar (DE); Julien Cances, Nantes (FR); Frederic Camy-Peyret, Paris (FR); Fabrice Mathey, St-remy les chevreuse (FR)

(72) Inventors: Holger Schlichting, Hofheim (DE); Ulrich Wolf, Egelsbach (DE); Sven Pohl, Frankfurt am Main (DE); Dieter Ulber, Steinbach (DE); Udo Zolnowski, Linden (DE); Antonio Coscia, Hadamar (DE); Julien Cances, Nantes (FR); Frederic Camy-Peyret, Paris (FR); Fabrice Mathey, St-remy les chevreuse (FR)

(73) Assignees: L'AIR LIQUIDE, SOCIETE ANONYME POUR L'ETUDE ET L'EXPLOITATION DES PROCEDES GEORGES CLAUDE, Paris (FR); AIR LIQUIDE GLOBAL E&C SOLUTIONS GERMANY GMBH, Frankfurt am Main (DE)

( * ) Notice: Subject to any disclaimer, the term of this patent is extended or adjusted under 35 U.S.C. 154(b) by 0 days.

(21) Appl. No.: 14/356,608

(22) PCT Filed: Nov. 7, 2012

(86) PCT No.: PCT/EP2012/072050
§ 371 (c)(1),
(2) Date: May 7, 2014

(87) PCT Pub. No.: WO2013/068416
PCT Pub. Date: May 16, 2013

(65) Prior Publication Data
US 2015/0076410 A1 Mar. 19, 2015

(30) Foreign Application Priority Data
Nov. 11, 2011 (DE) .......................... 10 2011 118 217

(51) Int. Cl.
*C01B 3/38* (2006.01)
*B01J 8/06* (2006.01)
*B01J 8/00* (2006.01)

(52) U.S. Cl.
CPC ................ *B01J 8/062* (2013.01); *B01J 8/0005* (2013.01); *B01J 8/065* (2013.01); *B01J 8/067* (2013.01);
(Continued)

(58) Field of Classification Search
CPC ................. B01J 2208/00141; B01J 2208/065; B01J 8/065; B01J 8/062; B01J 8/0005; B01J 2208/027; B01J 8/067; B01J 2208/0053; C01B 2203/0866; C01B 3/388; C01B 2203/0883; C01B 2203/1235; C01B 2203/0233; C01B 2203/0816; C01B 3/384
See application file for complete search history.

(56) References Cited

U.S. PATENT DOCUMENTS
3,442,618 A * 5/1969 Sederquist .................... 423/653
(Continued)

FOREIGN PATENT DOCUMENTS
DE 3806536 A1 9/1988

OTHER PUBLICATIONS

Higman, et al., "Synthesis gas processes for synfuels production", Eurogas 90: Proceedings for synfuels production, TAPIR PUBL, May 28, 1990, pp. 1-10.
Ullmann's Encyclopedia of Industrial Chemistry, Sixth Edition, Dec. 1998, "Gas Production".

*Primary Examiner* — Stanley Silverman
*Assistant Examiner* — Syed Iqbal
(74) *Attorney, Agent, or Firm* — Leydig, Voit & Mayer, Ltd.

(57) ABSTRACT

A reformer tube for producing synthesis gas by steam reforming of hydrocarbon-containing feed gases, preferably natural gas, includes one or more helically coiled heat exchanger tubes which are arranged within a catalyst bed of a reforming catalyst and are helically coiled over part of their length located within the catalyst bed and are otherwise straight are present, where the straight proportion of the heat exchanger tubes and/or the helix pitch of the helically coiled part alters within the catalyst bed and matching to requirements of the pressure drop, the heat exchange properties, and the corrosion resistance.

20 Claims, 3 Drawing Sheets

(52) U.S. Cl.
CPC ............... *C01B 3/384* (2013.01); *C01B 3/388* (2013.01); *B01J 2208/0053* (2013.01); *B01J 2208/00141* (2013.01); *B01J 2208/027* (2013.01); *B01J 2208/065* (2013.01); *C01B 2203/0233* (2013.01); *C01B 2203/0816* (2013.01); *C01B 2203/0866* (2013.01); *C01B 2203/0883* (2013.01); *C01B 2203/1235* (2013.01)

(56) References Cited

U.S. PATENT DOCUMENTS

| | | | | |
|---|---|---|---|---|
| 4,644,906 | A | * | 2/1987 | Garabedian ............. F22B 1/066 122/32 |
| 5,575,902 | A | * | 11/1996 | Heyse et al. ................. 208/48 R |
| 6,942,767 | B1 | * | 9/2005 | Fazzina et al. ................ 204/252 |
| 7,166,139 | B2 | | 1/2007 | Wunning |

* cited by examiner

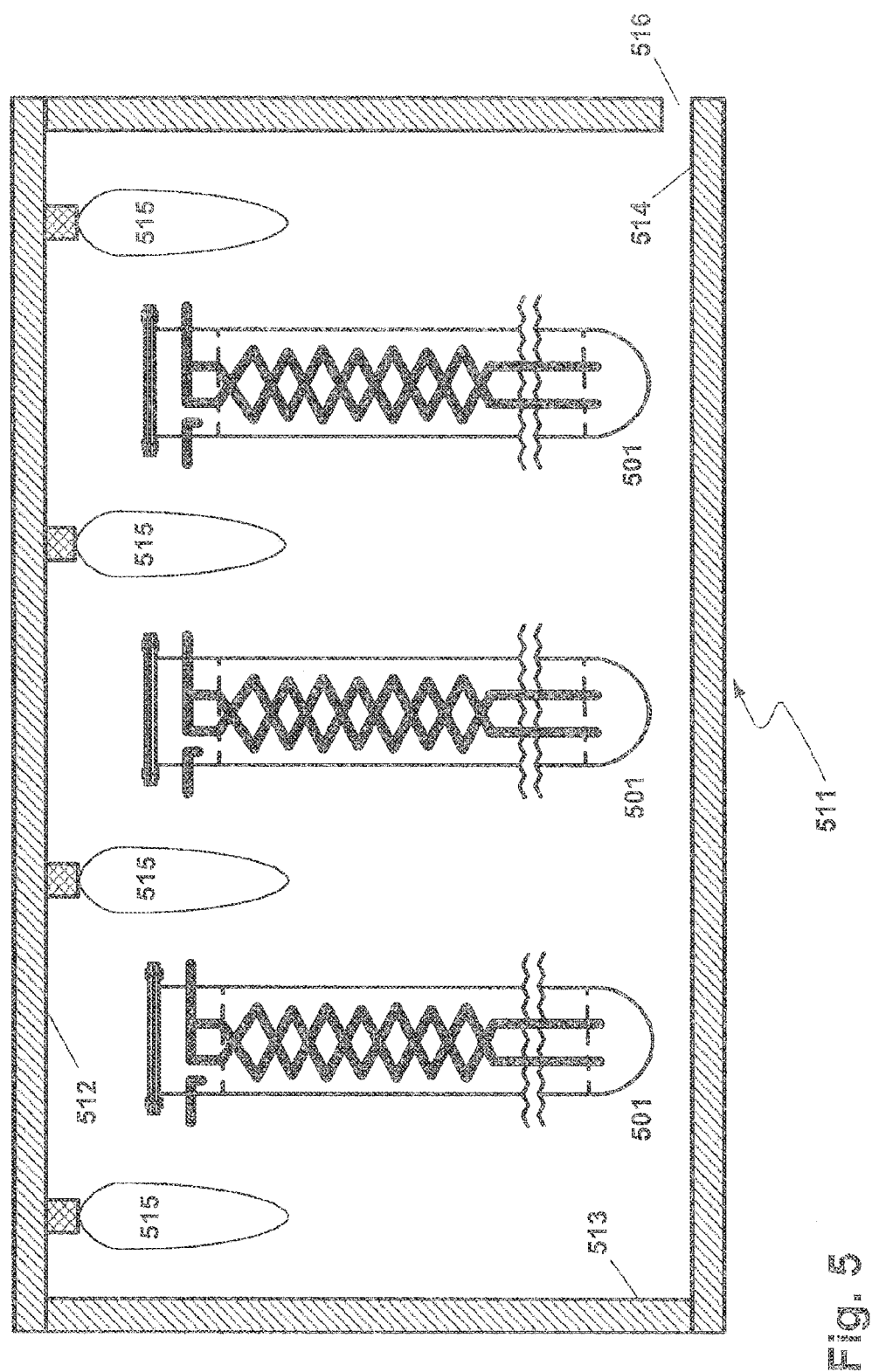

US 9,278,328 B2

REFORMER TUBE WITH INTERNAL HEAT EXCHANGE

CROSS-REFERENCE TO RELATED APPLICATIONS

This application is a U.S. National Phase Application under 35 U.S.C. §371 of International Application No. PCT/EP2012/072050, filed on Nov. 7, 2012, and claims benefit to German Patent Application No. DE 10 2011 118 217.2, filed on Nov. 11, 2011. The International Application was published in German on May 16, 2013, as WO 2013/068416 under PCT Article 21(2).

FIELD

This invention relates to a reformer tube for converting hydrocarbonaceous feedstocks, preferably natural gas and light liquid hydrocarbons such as naphtha, into a synthesis gas product containing carbon oxides and hydrogen. The reformer tube according to the invention provides for an internal heat exchange between the feed gas and the product gas partly converted to synthesis gas products, whereby advantages are obtained as regards the energy consumption during the production of synthesis gas and the valuable products hydrogen and carbon monoxide. This invention furthermore relates to a process for producing synthesis gas by steam reforming of hydrocarbonaceous feedstocks by using the reformer tube according to the invention, and to a reformer furnace equipped with a reformer tube.

BACKGROUND

By means of steam, hydrocarbons can catalytically be converted to synthesis gas, i.e. mixtures of hydrogen ($H_2$) and carbon monoxide (CO). As is explained in Ullmann's Encyclopedia of Industrial Chemistry, Sixth Edition, 1998 Electronic Release, keyword "Gas Production", this so-called steam reforming is the most frequently used method for the production of synthesis gas, which subsequently can be converted to further important basic chemicals such as methanol or ammonia. Although different hydrocarbons, such as naphtha, liquefied gas or refinery gases, can be converted, steam reforming with methane-containing natural gas is dominant.

The steam reforming of natural gas is strongly endothermal. Therefore, it is performed in a reformer furnace in which numerous catalyst-containing reformer tubes are arranged in parallel, in which tube the steam reforming reaction takes place. The outside walls of the reformer furnace as well as its ceiling and its bottom are lined or provided with several layers of refractory material which withstands temperatures up to 1200° C. The reformer tubes mostly are fired by means of burners which are mounted on the upper or lower surface or on the side walls of the reformer furnace and directly fire the space between the reformer tubes. The heat transfer to the reformer tubes is effected by thermal radiation and convective heat transmission from the hot flue gases.

After preheating by heat exchangers or fired heaters to about 500° C., the hydrocarbon-steam mixture enters into the reformer tubes after final heating to about 500 to 800° C. and is converted at the reforming catalyst to obtain carbon monoxide and hydrogen. Nickel-based reforming catalysts are widely used. While higher hydrocarbons are completely converted to carbon monoxide and hydrogen, a partial conversion usually is effected in the case of methane. The composition of the product gas is determined by the reaction equilibrium; beside carbon monoxide and hydrogen, the product gas therefore also contains carbon dioxide, non-converted methane and steam. For energy optimization or in the case of feedstocks with higher hydrocarbons, a so-called pre-reformer can be used after the preheater for pre-splitting the feedstock. In a further heater, the pre-split feedstock then is heated to the desired reformer tube inlet temperature.

After leaving the reformer furnace, the hot synthesis-gas product gas is partly cooled in one or more heat exchangers. The partly cooled synthesis-gas product gas subsequently undergoes further conditioning steps which are dependent on the type of product desired or on the succeeding process.

The steam reforming of natural gas is characterized by its high energy demand. The prior art therefore already includes suggestions in which it should be attempted to minimize the demand of foreign energy by an optimized procedure, for example by energy recovery. A so-called HCT reformer tube with internal heat exchange has been presented by Higman at the EUROGAS 90 Conference, Trondheim, June 1990. Said HCT reformer tube comprises an outer reformer tube filled with catalyst and heated from outside, in which the catalyst bed is traversed by the feed gas from top to bottom. In the interior of the catalyst bed, two coiled heat exchanger tubes arranged as double helix and made of a suitable material are provided, through which the partly reformed gas flows after leaving the catalyst bed and in doing so releases part of its sensible heat to the steam reforming process which takes place at the catalyst. Calculations and operational experiments have shown that at a typical inlet temperature of 450° C. into the catalyst bed and at a typical outlet temperature of 860° C. from the catalyst bed, up to 20% of the energy required for steam cracking can be recirculated to the steam reforming due to the internal heat exchange. Furthermore, up to 15% investment costs are saved, since the convection path in the reformer furnace can be designed smaller and less reformer tubes are required. What is disadvantageous, however, is the higher pressure loss due to the longer conduction path of the gas through the helically designed heat exchanger tubes. Furthermore, a corrosion referred to as "metal dusting" becomes noticeable to a greater extent, which will briefly be explained below, since longer portions of the heat exchanger tubes are exposed to the temperature range relevant for the "metal dusting" corrosion.

In many synthesis gas production plants, at higher gas temperatures, in particular in the range from 820° C. down to 520° C. in the gas production plants themselves and in the heat exchangers downstream of the same, corrosion problems occur at the metallic materials used, when a certain $CO_2/CO/H_2O$ ratio is reached. This applies both to ferritic and to austenitic steels. This removal of material known under the term "metal dusting" leads to a consumption or destruction of the material, and there are only limited possibilities to withstand this corrosion by an appropriate material composition.

SUMMARY

An aspect of the present invention provides a reformer tube for converting a hydrocarbonaceous feedstock into a synthesis gas product comprising a carbon oxide and hydrogen under steam reforming conditions, the reformer tube comprising: (a) an outer tube comprising an open tube end, a closed tube end, and a bed of a solid catalyst active suitable for steam reforming, wherein the outer tube is configured to be heated from outside; (b) a feed gas stream inlet, configured to feed in the feedstock, wherein the feed gas stream inlet is arranged at the open tube end and is in fluid connection with the catalyst bed; (c) a helically-coiled heat exchanger tube arranged within the catalyst bed, wherein a helically-coiled heat exchanger tube inlet end is in fluid connection with the catalyst bed and a helically-coiled heat exchanger tube outlet end is in fluid connection with a synthesis gas product stream outlet, and wherein the helically-coiled heat exchanger tube is in heat exchanging relationship with the catalyst bed and the feed gas stream flowing through the catalyst bed; and (d) a synthesis gas product stream outlet arranged at the open tube end and in fluid connection with the outlet end of the helically-coiled heat exchanger tube, but not in fluid connection with the inlet for the feed gas stream. The feed gas stream initially flows through the catalyst bed and subsequently in counterflow through the heat exchanger tube. The helically-coiled heat exchanger tube is coiled along a part of its length located within the catalyst bed and otherwise extends straight, or a coil pitch of the helically-coiled heat exchanger tube changes within the catalyst bed, or both.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 shows a reformer furnace with the reformer tubes according to the invention.

DETAILED DESCRIPTION

Figure 2:
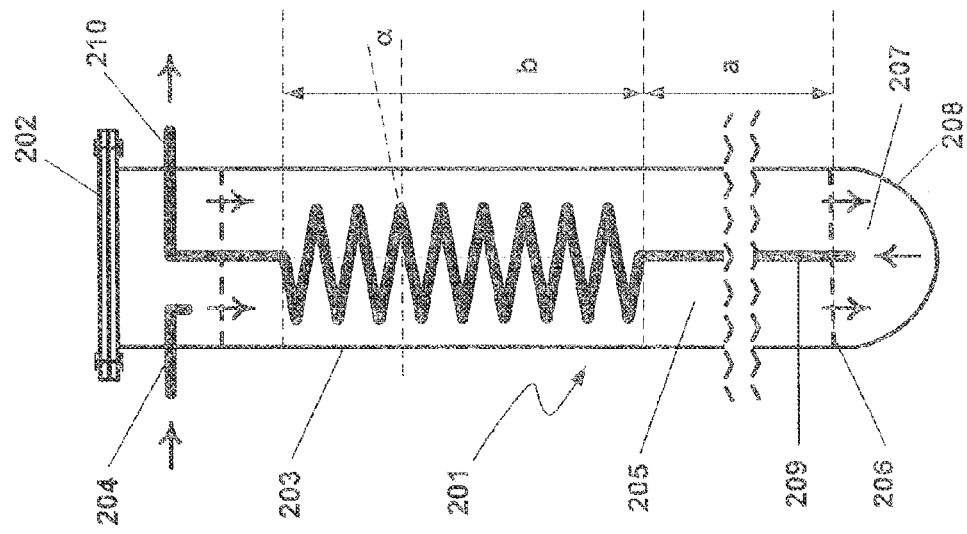
FIG. 2 shows the same reformer tube as in FIG. 1 in a more schematic representation.

An aspect of the invention provides a reformer tube for converting hydrocarbonaceous feedstocks, preferably natural gas, into a synthesis gas product containing carbon oxides and hydrogen under steam reforming conditions, comprising
- (a) an outer tube open at one tube end and closed at the opposite tube end, wherein the outer tube contains a bed of a solid catalyst active for steam reforming and is heated from outside,
- (b) an inlet for the feed gas stream containing the feedstock, wherein the inlet of the feed gas stream is arranged at the open tube end and is in fluid connection with the catalyst bed,
- (c) at least one helically coiled heat exchanger tube arranged within the catalyst bed, whose inlet end is in fluid connection with the catalyst bed and whose outlet end is in fluid connection with the outlet for the synthesis gas product stream, wherein the heat exchanger tube is in a heat-exchanging relationship with the catalyst bed and the feed gas stream flowing through the same,
- (d) an outlet for the synthesis gas product stream, wherein the outlet is arranged at the open tube end and is in fluid connection with the outlet end of the heat exchanger tube, but not in fluid connection with the inlet for the feed gas stream, wherein the feed gas stream initially flows through the catalyst bed and then in counterflow through the heat exchanger tube, characterized in that the heat exchanger tube is coiled along a part of its length located within the catalyst bed and otherwise extends straight and/or that the coil pitch changes within the catalyst bed.

Fluid connection between two regions of the reformer tube is understood to be any kind of connection which enables a fluid, for example the feed gas stream or the synthesis gas product stream, to flow from the one to the other of the two regions, regardless of any interconnected regions or components. Heat-exchanging relationship refers to the possibility of the heat exchange or the heat transmission between two regions of the reformer tube, wherein all mechanisms of the heat exchange or the heat transmission such as heat conduction, heat radiation or convective heat transport can be employed.

The open tube end of the outer tube is characterized in that in operation of the reformer tube all material flows are guided through the same, whereas no material flows whatsoever are introduced or discharged through the closed tube end. The feed line for the feed gas stream and the discharge line for the synthesis gas product stream therefore are located at the open tube end. In operation of the reformer tube, the open tube end of course is closed with a closure device, for example with a flange-mounted lid.

An aspect of the invention also relates to a reformer furnace, comprising walls with a refractory lining, a ceiling and a bottom and an interior space formed thereby, characterized in that at least one reformer tube according to the invention and at least one burner for heating the reformer tube are arranged in the interior space or in a secondary space which is in fluid connection with the interior space with respect to the burner flue gases.

Furthermore, an aspect of the invention also relates to a process for producing synthesis gas by catalytic steam reforming of hydrocarbonaceous feedstocks, preferably natural gas, under steam reforming conditions in the presence of a solid catalyst active for steam reforming, comprising the following steps:
- (a) providing a feed gas stream containing the feedstock and addition of reforming steam,
- (b) catalytic conversion of the feedstock under steam reforming conditions to obtain a synthesis gas product containing carbon oxides and hydrogen,
- (c) discharging and optionally reprocessing the synthesis gas product, characterized in that the catalytic conversion in step (b) is effected in a reformer tube according to the invention.

An aspect of the invention is based on the finding that both the pressure loss and the sensitivity to the "metal dusting" corrosion are related to the total length of the conduction path of the partly converted feed gas, which already contains carbon oxides and hydrogen, through the heat exchanger tubes. The total length of the conduction path through the heat exchanger tubes can be reduced by the following measures:
- (1) The heat exchanger tube arranged within the catalyst bed is not coiled along its entire length, but also comprises a non-coiled part extending straight,
- (2) in the heat exchanger tube arranged with the catalyst bed the windings succeeding each other in the coiled region do not have a constant distance from each other, but a changed distance in at least one point. What is also conceivable is a continuous change in distance between two successive windings each. This leads to the fact that the coil pitch correspondingly changes in at least one point or also continuously, wherein a greater coil pitch corresponds to an increased winding distance.

Both measures can each be employed separately or also in combination with each other and solve the object underlying the invention. It was surprisingly found, however, that the pressure loss and the sensitivity to the "metal dusting" corrosion decrease significantly, but the heat transmission properties are only moderately reduced at the same time, when in the reformer tube according to the invention the heat exchanger tube only is coiled along a part of its length located within the catalyst bed and otherwise extends straight and/or when the coil pitch changes within the catalyst bed.

In the reformer tube according to the invention, the coiled portion of the heat exchanger tube and/or the change in the coil pitch within the catalyst bed preferably are chosen such that with a defined feed gas stream and temperature of the feed gas at the inlet, the outlet temperature lies above the temperature range active for the metal corrosion by "metal dusting". The approximate range in which this type of metal corrosion can occur has already been mentioned above.

However, it also depends on the exact composition of the synthesis gas product and thus on the exact reaction conditions during steam reforming. By carrying out routine experiments concerning the "metal dusting" corrosion, the skilled person can determine the upper limit temperature to be chosen for the synthesis gas composition in consideration and thus define the coiled part or the coil pitch of the heat exchanger tube such that with defined conditions at the inlet of the reformer tube the outlet temperature of the synthesis gas product stream from the reformer tube securely lies above this limit temperature.

Furthermore, it is preferred that the coiled portion of the heat exchanger tube and/or the change in the coil pitch within the catalyst bed are chosen such that with a defined feed gas stream and temperature of the feed gas at the inlet, the pressure loss between inlet and outlet lies below a defined maximum value. Here as well, the skilled person can select a suitable upper limit value for the tolerable pressure loss. It substantially depends on the marginal conditions of the plant in consideration, for example on the pressure requirements of the conditioning and processing stages of the synthesis gas product downstream of the reformer.

It is preferred particularly when the coiled portion of the heat exchanger tube is arranged in the vicinity of the outlet end of the heat exchanger tube. In this region of the reformer tube, the main part of the steam reforming reaction takes place, so that due to the endothermal course of the reaction the locally required energy is particularly high. At this point, an improved heat transfer due to an increased heat-exchange surface therefore leads to a particularly marked savings potential for foreign energy. This effect can even be increased in that the coil pitch of the heat exchanger tube decreases towards the outlet end of the heat exchanger tube, as then in a region of higher energy demand more windings and thus a greater heat-exchange surface is present than in a region of lower energy demand. When this decrease of the coil pitch is effected continuously in direction of the outlet end of the heat exchanger tube, the locally different energy demands of the steam reforming reaction are approached particularly well.

It was found to be particularly favorable that the heat exchanger tube is coiled along a part of not more than 90% of its length located within the catalyst bed. This will be explained in greater detail in the following discussion of exemplary embodiments and numerical examples.

An advantageous aspect of the reformer tube according to the invention provides to arrange a free space within the outer tube at the closed tube end, which is separated from the catalyst bed by a gas-permeable separating device, for example a frit, a grating or a perforated plate, wherein the inlet end of the heat exchanger tube or heat exchanger tubes protrudes into the free space and wherein the free space is in fluid connection with the catalyst bed and the heat exchanger tube. It was found that such free space efficiently protects the heat exchanger tubes against soiling or clogging for example due to catalyst abrasion, since here the flow direction of the gas flow is reversed, so that the abraded catalyst particles accumulate in the free space and are kept away from the inlet end of the heat exchanger tube. The separating device also serves the centering and retention of the heat exchanger tubes and increases the mechanical stability of the reformer tube.

Particularly preferably, the reformer tube according to the invention is equipped with two heat exchanger tubes which are arranged in the catalyst bed in the form of a double helix. This design of the reformer tube represents a favorable compromise between technical expenditure and favorable heat transmission properties.

In a further preferred aspect, the outlet end of the heat exchanger tube opens into a brick-lined or coated tube portion, wherein the brick lining or coating consists of a material particularly resistant to the "metal dusting" corrosion. In this way, the "metal dusting" corrosion can further be reduced efficiently, since in particular at the outlet for the synthesis gas product stream the temperature window relevant for this type of corrosion is traversed. When the reformer tube is equipped with two or more heat exchanger tubes, the outlets of the two heat exchanger tubes favorably open into a correspondingly brick-lined or coated collecting line.

In principle, the reformer tube according to the invention can be operated with various solid catalysts for steam reforming. The use of nickel-based catalysts which are provided by the trade was found to be particularly advantageous.

A preferred aspect of the reformer furnace according to the invention provides that the closed tube end of the reformer tube is arranged freely suspended in the furnace interior. This is particularly favorable as in this way thermo-mechanical stresses between the inlet for the feed gas stream and the outlet for the synthesis gas product stream are avoided, which result from the considerable temperature differences in the reformer tubes known from the prior art. In the latter, expensive measures such as the use of stress compensators (so-called pigtails) or Bowden cables are employed, in order to compensate the occurring stresses and their negative influences, for example a deformation of the reformer tube. This is no longer necessary in the hanging arrangement of the reformer tube.

In a further preferred aspect of the reformer furnace it is provided that a plurality of reformer tubes and burners are arranged in the furnace interior and that the longitudinal axes of the flames generated by the burners are aligned parallel to the longitudinal axes of the reformer tubes. In this way, it can be ensured that the reformer tubes arranged around a burner are uniformly heated by the same. Furthermore, due to the flame axes extending in parallel, radiation heat is supplied to the reformer tubes along a longer path and a local overheating of the outsides of the reformer tubes is avoided.

Further developments, advantages and possible applications of the invention can also be taken from the following description of exemplary embodiments and numerical examples and the drawings. All features described and/or illustrated form the invention per se or in any combination, independent of their inclusion in the claims or their back-reference.

Figure 1:
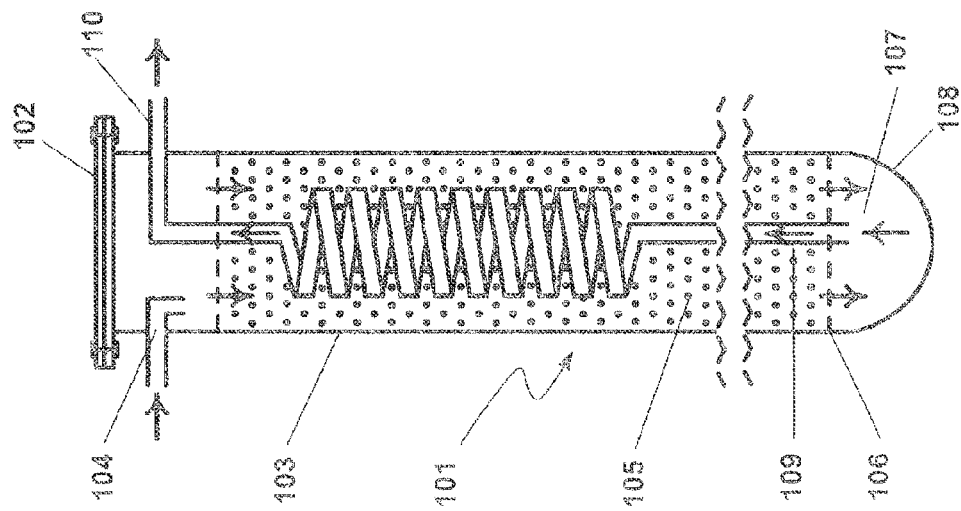
FIG. 1 shows a reformer tube according to a first preferred embodiment of the invention.

In the reformer tube 101 according to a first preferred embodiment of the invention, which is schematically shown in FIG. 1, desulfurized natural gas along with reforming steam enters into the open tube end 102 of the outer tube 103 via the inlet line 104. The outer tube consists of a nickel-chromium steel, for example of the type G-X45NiCrNbTi3525. The inlet temperature of the feed gas is 600° C., the space velocity based on the catalyst volume typically is 4000 to 5000 $m_N^3/(m^3h)$. The reformer tube is vertically arranged with the open tube end in an upper position and is heated from outside by means of burners (not shown in FIG. 1). The natural gas and the reforming steam then enter into the catalyst bed 105 which is formed of particles of a solid, nickel-based reforming catalyst. In FIG. 1, the catalyst bed is schematically represented by dots and is fixed in the outer tube by means of a perforated plate 106. At the reforming catalyst, the endothermal steam reforming reaction takes place. After leaving the catalyst bed, the partly converted natural gas, which beside carbon oxides and hydrogen also contains not yet converted methane, enters into a free space 107 which is arranged at the closed tube end 108 of the outer tube and is separated from the catalyst bed by the perforated plate. Subsequently, the partly converted feed gas stream enters into the inlet end of the heat exchanger tube 109 arranged within the catalyst bed, which consists of a part extending straight, followed by a coiled part. The gas stream flowing through the heat exchanger tube countercurrently releases part of its sensible heat to the catalyst bed and the feed gas stream flowing through the same. The heat exchange is more intensive in the coiled part of the heat exchanger tube, since here a larger heat-exchange surface is available per volume element. The heat exchanger tube consists of materials with good resistance to "metal dusting" corrosion, such as Alloy 601, 602 CA, 617, 690, 692, 693, HR 160, HR 214, copper-containing alloys or so-called multilayer materials, in which the tubes are coated with tin-nickel or aluminum-nickel alloys. After flowing through the heat exchanger tube, the synthesis gas product stream exits from the reformer tube at the open tube end of the outer tube via the discharge line 110 and is supplied to the further processing. Depending on the intended use of the synthesis gas product, the same can comprise a carbon monoxide conversion, a gas scrubber for separating carbon dioxide, a pressure swing adsorption for hydrogen separation and further processing stages.

In FIG. 2 the same reformer tube was shown as in FIG. 1, but in a more schematic manner, in order to illustrate a few definitions and geometrical relations. The reference numerals of FIGS. 1 (10x, 1xx) and 2 (20x, 2xx) correspond to each other in terms of the elements designated by them. The same applies to the succeeding FIGS. 3 to 5.

The longitudinal portion a of the heat exchanger tube 209 designates its straight part, the longitudinal portion b designates the coiled part each within the catalyst bed. Coil pitch $\alpha$ is understood to be the angle which is included between the center line of the winding portion in consideration and a plane which is vertical to the longitudinal axis of the coiled part of the heat exchanger tube.

Figure 3:
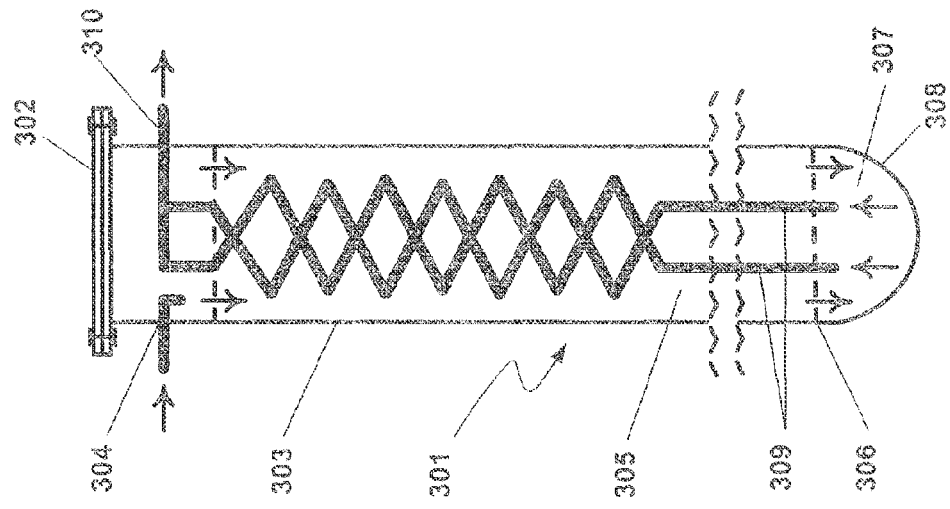
FIG. 3 shows a reformer tube according to a second preferred embodiment of the invention.

FIG. 3 shows a reformer tube according to a second preferred embodiment of the invention, in which two heat exchanger tubes 309 are arranged as double helix within the catalyst bed. Both heat exchanger tubes are fixed by means of the perforated plate 306 and at the outlet end open into a common collecting line which is connected with the discharge line 310 through which the synthesis gas product stream exits from the reformer tube. On its inside, the collecting line is provided with a ceramic coating which has an increased resistance to the "metal dusting" corrosion.

Figure 4:
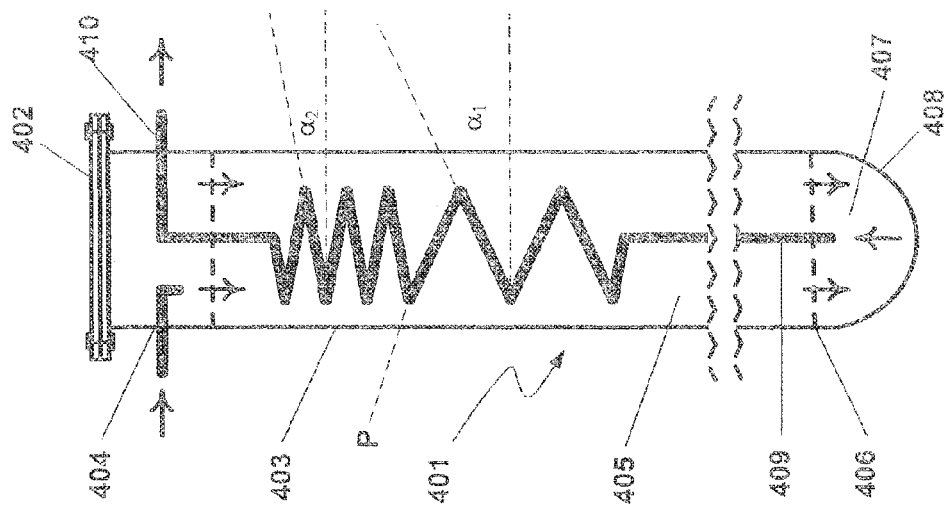
FIG. 4 shows a reformer tube according to a third preferred embodiment of the invention.

FIG. 4 shows a reformer tube according to a third preferred embodiment of the invention, in which the coiled part of the heat exchanger tube is divided in two portions with different coil pitch $\alpha_1$, $\alpha_2$. From the point P, the coil pitch abruptly decreases from the greater value $\alpha_1$ to the smaller value $\alpha_2$. Although not illustrated, the invention also relates to a corresponding embodiment with several, preferably two heat exchanger tubes which in their coiled part have different coil pitches.

What is not illustrated either, but is advantageous, is an embodiment of the invention in which the coil pitch changes continuously, for example decreases in flow direction of the gas flowing through the heat exchanger tube down to a lower limit value. In this way, the specific heat demands of the steam reforming reaction, which are different at different points of the catalyst bed, are approached to the steam reforming reaction particularly well.

FIG. 5 schematically shows a reformer furnace 511 with the reformer tubes 501 according to the invention. The reformer tubes are arranged freely suspended in the reformer furnace, wherein the open tube ends of the reformer tubes are mechanically connected with the ceiling 512 of the reformer furnace or one or more side walls 513 (not shown in FIG. 5). No mechanical connection exists, however, between the closed tube ends of the reformer tubes and the bottom 514 of the reformer furnace. The reformer furnace is heated by means of burners 515, wherein the longitudinal axes of the flames generated by the burners are aligned parallel to the longitudinal axes of the reformer tubes. The burner flue gases leave the reformer furnace via the outlet opening 516 and are treated further in a manner known to the skilled person.

In the following Table, two embodiments A and B of the reformer tube according to the invention are compared with a comparative example. All reformer tubes in consideration have an inside diameter of the outer tube of 125 mm and each contain two heat exchanger tubes embedded in the catalyst bed. The outside diameter of the coiled portion of the heat exchanger tubes is 117 mm, which results in a distance of about 4 mm to the inside of the outer tube. The ratio of the length of the straight part of the heat exchanger tube a to the total length of the heat exchanger tube a+b (for definition see FIG. 2) is 7% in the comparative example, but 19% and 50% in embodiments A and B.

|  | Comparative Example | Invention, Case A | Invention, Case B |
|---|---|---|---|
| Straight part of heat exchanger tube a/(a + b) | 7% | 19% | 50% |
| Conditions inlet reformer tube |  |  |  |
| Temperature/° C. | 600 | 600 | 600 |
| Pressure/bar, absolute | 27.9 | 27.9 | 27.9 |
| Conditions inlet heat exchanger tube |  |  |  |
| Temperature/° C. | 890 | 890 | 890 |
| Relative pressure loss via reformer tube based on comparative example/% | 100 | 89 | 70 |
| Relative heat quantity transmitted based on comparative example/% | 100 | 95 | 81 |

As shown by the cases represented in the Table, the pressure loss via the reformer tube and the heat flow to the catalyst bed can be adapted to the requirements by varying the straight part of the heat exchanger tube with respect to the comparative example, in which the straight part of the heat exchanger tube merely is 7%. For example, the pressure loss can be lowered by 11% and the heat flow to the catalyst bed can be lowered by 5%, in that the straight part of the heat exchanger tube is increased from 7% to 19%. With a further increase of the straight part of the heat exchanger tube from 7% to 50%, the pressure loss even is reduced by 30%, while the heat flow to the catalyst bed drops by 19%. It is surprising here that with a given decrease of the pressure loss, the decrease of the heat flow to the catalyst bed is effected in an underproportional way, so that for the respective marginal conditions a reformer tube can be determined, which still has good heat exchange properties with distinctly reduced pressure loss. This becomes possible with the invention by the corresponding selection of the straight part of the heat exchanger tube and/or by an appropriate selection of the coil pitch.

INDUSTRIAL APPLICABILITY

With the invention a reformer tube is proposed, which provides for an internal heat exchange between the feed gas and the product gas partly converted to synthesis gas products, whereby advantages are obtained as regards the energy consumption when using the reformer tube. Due to the inventive adaptation of the straight part of the heat exchanger tube and/or by an appropriate selection of the coil pitch, which can change once or repeatedly within the coiled part, the reformer tube can flexibly be adapted to the external conditions of the process. In particular, the invention provides for efficiently counteracting the "metal dusting" corrosion.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS

[101], [201], [301], [401], [501] reformer tube
[102], [202], [302], [402], [502] open tube end
[103], [203], [303], [403], [503] outer tube
[104], [204], [304], [404], [504] inlet line
[105], [205], [305], [405], [505] catalyst bed
[106], [206], [306], [406], [506] perforated plate
[107], [207], [307], [407], [507] free space
[108], [208], [308], [408], [508] closed tube end
[109], [209], [309], [409], [509] heat exchanger tube
[110], [210], [310], [410], [510] outlet line
[511] reformer furnace
[512] ceiling
[513] side wall
[514] bottom
[515] burner
[516] outlet opening

The invention claimed is:

1. A reformer tube for converting a hydrocarbonaceous feedstock into a synthesis gas product comprising a carbon oxide and hydrogen under steam reforming conditions, the reformer tube comprising:
   (a) an outer tube comprising an open tube end, a closed tube end, and a bed of a solid catalyst active suitable for steam reforming, wherein the outer tube is configured to be heated from outside;
   (b) a feed gas stream inlet, configured to feed in the feedstock, wherein the feed gas stream inlet is arranged at the open tube end and is in fluid connection with the catalyst bed;
   (c) a helically-coiled heat exchanger tube arranged within the catalyst bed, wherein a helically-coiled heat exchanger tube inlet end is in fluid connection with the catalyst bed and a helically-coiled heat exchanger tube outlet end is in fluid connection with a synthesis gas product stream outlet, and wherein the helically-coiled heat exchanger tube is in heat exchanging relationship with the catalyst bed and the feed gas stream flowing through the catalyst bed; and
   (d) a synthesis gas product stream outlet arranged at the open tube end and in fluid connection with the outlet end of the helically-coiled heat exchanger tube, but not in fluid connection with the inlet for the feed gas stream,
   wherein the feed gas stream initially flows through the catalyst bed and subsequently in counterflow through the heat exchanger tube,
   wherein (i) the helically-coiled heat exchanger tube is coiled along not more than 90% of its length located within the catalyst bed and otherwise extends straight, or (ii) a coil pitch of the helically-coiled heat exchanger tube changes within the catalyst bed, or (iii) both.

2. The reformer tube of claim 1, wherein
a coiled part of the helically-coiled heat exchanger tube,
a change in the coil pitch within the catalyst bed, or
both,
are configured such that with a defined feed gas stream and temperature of the feed gas at the feed gas stream inlet, an outlet temperature lies above a temperature range active for metal corrosion by metal dusting.

3. The reformer tube of claim 1, wherein
a coiled part of the helically-coiled heat exchanger tube,
a change in the coil pitch within the catalyst bed, or
both,
are configured such that with a defined feed gas stream and temperature of the feed gas at the feed gas stream inlet, a pressure loss between inlet and outlet lies below a defined maximum value.

4. The reformer tube of claim 1 wherein a coiled part of the helically-coiled heat exchanger tube is arranged in the vicinity of the helically-coiled heat exchanger tube outlet end.

5. The reformer tube of claim 4, wherein a coil pitch of the helically-coiled heat exchanger tube decreases towards the helically-coiled heat exchanger tube outlet end.

6. The reformer tube of claim 1 wherein the helically-coiled heat exchanger tube is coiled along a part of not more than 90% of its length located within the catalyst bed.

7. The reformer tube of claim 1 wherein a free space arranged within the outer tube at the closed tube end,
wherein the free space is separated from the catalyst bed by a gas-permeable separating device, wherein an inlet end of at least one helically-coiled heat exchanger tube protrudes into the free space, and wherein the free space is in fluid connection with the catalyst bed and the helically-coiled heat exchanger tube.

8. The reformer tube of claim 1 comprising two helically-coiled heat exchanger tubes.

9. The reformer tube of claim 1 wherein the solid catalyst active comprises nickel.

10. The reformer tube of claim 1 wherein the helically-coiled heat exchanger tube outlet end opens into a brick-lined or coated tube portion, wherein the brick lining or coating comprises a material resistant to metal dusting.

11. A reformer furnace, comprising:
a wall comprising a refractory lining;
a ceiling;
a bottom; and
an interior space formed by the wall, ceiling and bottom
wherein the reformer tube of claim 1 and a burner configured to heat the reformer tube are arranged in the interior space or in a secondary space which is in fluid connection with the interior space with respect to the burner flue gases.

12. The reformer furnace of claim 11, wherein the closed tube end is arranged freely suspended in the interior space.

13. The reformer furnace of claim 11, comprising a plurality of reformer tubes and burners arranged in the interior space, wherein longitudinal axes of flames generated by the burners are aligned parallel to longitudinal axes of the reformer tubes.

14. A process for producing synthesis gas by catalytic steam reforming of a hydrocarbonaceous feedstock under steam reforming conditions in the presence of a solid catalyst active suitable for steam reforming, the method comprising:

(a) providing a feed gas stream comprising the feedstock, and adding reforming steam;

(b) catalytically converting the feedstock under steam reforming conditions to obtain a synthesis gas product comprising a carbon oxide and hydrogen;

(c) discharging and optionally reprocessing the synthesis gas product, wherein the catalytically converting (b) is effected in the reformer tube of claim 1.

15. The reformer tube of claim 1, wherein the coil pitch of the helically-coiled heat exchanger tube changes within the catalyst bed.

16. The reformer tube of claim 1, wherein the helically-coiled heat exchanger tube is coiled along not more than 90% of its length located within the catalyst bed and otherwise extends straight, and wherein the coil pitch of the helically-coiled heat exchanger tube changes within the catalyst bed.

17. The method of claim 14, wherein the hydrocarbonaceous feedstock is natural gas.

18. The reformer tube of claim 1, wherein the coil pitch changes continuously.

19. The reformer tube of claim 1 wherein the helically-coiled heat exchanger tube is coiled along a part of in a range of from 50% to not more than 90% of its length located within the catalyst bed.

20. The reformer tube of claim 1, comprising two of the heat exchanger tubes, arranged in the catalyst bed as a double helix.

* * * * *